United States Patent [19]

Kato et al.

[11] Patent Number: 4,690,565
[45] Date of Patent: Sep. 1, 1987

[54] OPTICAL APPARATUS FOR THE DETECTION OF SCATTERED LIGHT

[75] Inventors: Kinya Kato; Hiroyuki Tsuchiya, both of Tokyo, Japan

[73] Assignee: Nippon Kogaku K. K., Tokyo, Japan

[21] Appl. No.: 711,163

[22] Filed: Mar. 13, 1985

[30] Foreign Application Priority Data

Mar. 19, 1984 [JP] Japan ................................. 59-53347

[51] Int. Cl.$^4$ ............................................. G01B 11/02
[52] U.S. Cl. ..................................... 356/446; 356/384
[58] Field of Search ............... 356/446, 384, 385, 342, 356/416; 250/563

[56] References Cited

U.S. PATENT DOCUMENTS 2,852,693  9/1958  Hughes et al. ..................... 356/446
4,423,331 12/1983  Koizumi et al. .................... 356/446

Primary Examiner—R. A. Rosenberger
Attorney, Agent, or Firm—Shapiro and Shapiro

[57] ABSTRACT

An optical apparatus for the detection of scattered light has a light source for supplying a beam of light with a determined wavelength, an objective lens for focusing the light beam on a test object and a photo receptor for receiving the light scattered around the objective lens by the boundaries of a pattern on the test object. The apparatus further has a light converging ring member and a filter arranged in the optical path between the test object and the photo receptor to allow the scattered light from the test object to enter the filter and the photo receptor after the scattered light is converted into a beam of substantially collimated rays by the action of reflection and convergence by the converging ring member.

9 Claims, 5 Drawing Figures

OPTICAL APPARATUS FOR THE DETECTION OF SCATTERED LIGHT

BACKGROUND OF THE INVENTION

1. Field of the Invention

The present invention relates to apparatus for measuring micro-patterns, especially for detecting and measuring the boundaries in micro-patterns.

2. Description of the Prior Art

In the prior art there is known apparatus for measuring the width of a line using a laser beam, an example of which is schematically shown in FIG. 4. In this figure, reference numeral 1 denotes a beam of laser light. Through an objective lens 2, the laser beam is focused on a test object 5 and forms a laser spot to scan the test object. When the laser spot is scattered by an edge or the like on the test object 5, the scattered light 3 is received by photo sensors or receptors 4 arranged near the objective lens 2 as illustrated by FIG. 4. The measuring apparatus detects and determines the position of the edge from the amount of relative movement between the laser spot and the test object and also from the signal coming from the photo sensors 4. FIG. 5 shows an example of the relation between the position of edges (5a, 5b) of the test object 5 and the output signal (4a, 4b) of the photo sensor 4 derived from the light scattered by the edges.

Although the prior art apparatus as shown above is able to detect and measure very small micro-patterns, the accuracy of measurement is not so high and it is unsatisfactory. The reason for this is that since the apparatus is designed to detect scattered light, there a high possibility of the entrance of stray light in the photo sensors in addition to the laser light. Therefore, there are generated noise signals which reduce the accuracy of measurement. A known method for minimizing such noise is to additionally provide an interference filter directly before the photo sensor which transmits the laser light only. However, since the spectral characteristics of the interference filter are generally variable depending on the angle of incidence, it has been found difficult to sufficiently eliminate the stray light by this solution. As another solution it has been proposed to carry out the measurement while minutely oscillating the laser beam to minimize the effect of noise on the measuring signal. But, this solution also has a drawback in that it needs a large and complicated apparatus.

SUMMARY OF THE INVENTION

Accordingly, it is an object of the invention to minimize the stray light entering the photo sensors in an optical apparatus for the detection of scattered light.

It is another object of the invention to provide an improved apparatus which enables detection and measurement of micro-patterns with higher accuracy and precision than that attainable by the prior art apparatus.

It is a further object of the invention to provide an optical apparatus for the detection of scattered light which is very simple in structure.

Other objects, features and advantages of the present invention will appear more fully from reading the following description.

DESCRIPTION OF PREFERRED EMBODIMENTS

In order to attain the above objects, the present invention provides an optical apparatus for the detection of scattered light having light source means for supplying a beam of light with a determined wavelength, an objective lens for focusing the light beam on a test object and a photo receptor for receiving the light scattered around the objective lens by the boundaries of a pattern on the test object, which apparatus is characterized in that a light-converging ring member and a filter are arranged in the optical path between the test object and the photo receptor to allow the scattered light from the test object to enter the filter and the photo receptor after the scattered light has been converted into a beam of substantially collimated rays by the action of reflection and convergence by the converging ring member. In a preferred embodiment, the converging ring member is a concave reflecting member. The filter used in the invention is a filter which is able to transmit the wavelength of the light focused by the objective lens while filtering off the light in other wavelength regions. With the arrangement of the present invention, the divergent scattered light from the test object is converted into a beam of substantially collimated rays by the converging action of the converging ring member. Therefore, it is possible to avoid the adverse effect of characteristic variation of the filter depending on the angle of incidence.

Furthermore, this arrangement according to the invention enables reduction of the size of the photo receptor (photo sensor) to a great extent. When the converging ring member is formed as an annular concave reflecting member, the scattered light, even if it has a large angle of scatter, can be guided to the photo receptor very well. S/N ratio can be improved further and higher accuracy of measurement can be realized. The most preferred form of the concave reflecting member is a paraboloidal mirror. When the focus of the paraboloid is positioned just at the point at which the light beam is focused by the objective lens, that is, the point at which the optical axis of the objective lens and the surface of the test piece intersect each other, the light scattered by the pattern boundary on the test piece can be converted into a beam almost completely collimated. Therefore, it is possible to minimize the adverse effect of characteristic variation with incident angle of the interference filter which is the most preferred one as the filter used in the invention. However, at present, it is very difficult to make a paraboloidal mirror surface. In view of this, it is practically advisable to use a spherical surface similar to the most preferred paraboloid.

Figure 1:
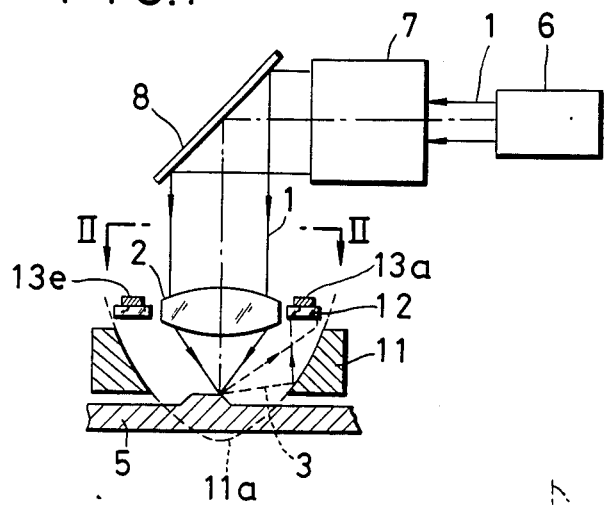
FIG. 1 is a schematic sectional view of an optical apparatus for the detection of scattered light showing an embodiment of the invention.

Referring to FIG. 1, there is shown an embodiment of the present invention.

In the optical apparatus for the detection of scattered light according to the invention, a beam of laser light 1 is generated from a laser light source 6 and the beam diameter is expanded by a beam expander 7. After reflection by a reflecting member 8, the laser beam is focused on a test object 5 through an objective lens 2.

When the laser beam is scattered by an edge which may be a boundary of a pattern on the test piece 5, the scattered light 3 is reflected by an annular concave reflecting member 11 disposed between the objective 2 and the test piece 5. The reflecting member 11 reflects the scattered light in the direction substantially parallel to the optical axis of the objective lens 2 while converging the light at the same time. The reflecting member 11 has a concave reflecting surface in the shape of a paraboloid 11a the rotation symmetry axis of which is on the optical axis of the objective lens 2. The paraboloidal reflecting surface 11a is so disposed that the focal point of the paraboloid 11a is nearly coincident with the focal point of the objective lens on the test piece side, that is, the point at which the laser beam is focused on the test piece by the objective lens 2. With this arrangement, the scattered light rays running from the test object surface to the paraboloidal surface are converted into collimated rays running in parallel with the optical axis of the objective lens.

The scattered light substantially collimated in the manner described above enters a filter 12 and then photo sensors 13a, 13e arranged around the objective lens. The photo sensors 13a, 13e output an electric signal corresponding to the intensity of the received light.

The filter 12 is a filter which transmits only a narrow wavelength region of laser exclusively. The filter and the photo sensors are connected together. The filter surface and the light receiving surface of the photo sensors are disposed in planes intersecting the optical axis of the objective lens approximately at right angles. Therefore, the scattered light incident on the filter from the concave reflecting member is a beam of collimated rays substantially normal to the filter. Almost all of the rays falling on the filter have the same angle of incidence to the interference film which constitutes the filter 12. Thus, the adverse effect of variation in filter characteristics depending upon the angle of incidence can be eliminated. Only the light of laser region wavelength reaches the photo sensors, which assures the correct detection of only the light scattered by the pattern boundary on the test piece.

Figure 2:
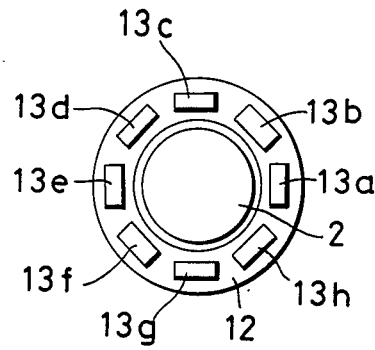
FIG. 2 is a plan of the embodiment taken along the arrows II—II in FIG. 1.

The arrangement of photo sensors on the filter is shown in detail in FIG. 2. The annular filter 12 surrounds the objective lens 2. Eight photo sensors 13a–13h are regularly arranged on the annular filter 12 at equal angular intervals. As many photo sensors are arranged in this manner, the scattered light by every boundary line on the test piece can be detected without fail irrespective of the direction of line.

In the above embodiment, the laser reflecting member 8 may be replaced by a dichroic mirror to observe the test object surface by the light transmitted through the dichroic mirror.

Figure 3:
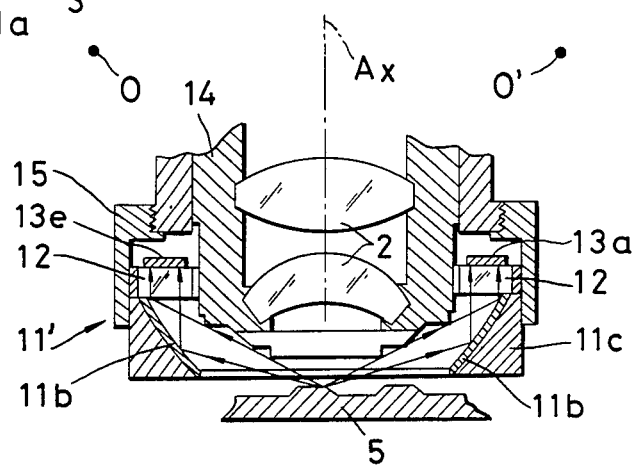
FIG. 3 is a sectional view of the essential part of a second embodiment of the invention.
Figure 4:
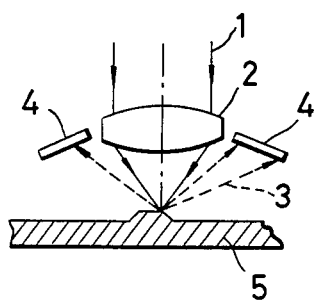
FIG. 4 is a schematic illustration of the construction of a prior art optical apparatus for the detection of scattered light.
Figure 5:
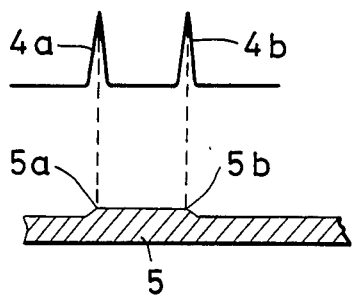
FIG. 5 shows an example of the scattered light detection signal from the prior art optical apparatus in FIG. 4.

FIG. 3 shows a second embodiment of the optical apparatus for the detection of scattered light according to the invention. Reference numeral like those in FIG. 2 represent the same or corresponding members.

In the above first embodiment, the converging ring member has been shown as a concave reflecting member 11 having a paraboloidal surface. In this second embodiment, as the concave reflecting surface, there is used a toroidal surface 11b in stead of paraboloidal surface. The section of the toroidal surface 11b taken along a plane containing the optical axis Ax of the objective lens is circular as seen from FIG. 3. The centers of curvature of the circles as viewed on the section are 0 and 0' outside the optical axis. The spherical surface obtained by rotating the circle about the optical axis Ax is the toroidal surface 11b. This surface is formed of a metal reflecting mirror supported on a support member 11c. This toroidal surface is not exactly the same as the paraboloidal surface the focus of which is just at the point at which the laser beam is focused through the objective lens. But, the toroidal surface is very similar to the paraboloid and it can function as the paraboloidal surface in approximation. Therefore, when the scattered light from the test piece is reflected by the toroidal surface 11b, the light is converted into a beam of collimated rays running substantially in parallel with the optical axis of the objective lens 2 as indicated by the arrows in FIG. 3. Obviously the scattered light is reflected almost in the same manner as in the first embodiment. The effect attainable by the second embodiment is nearly the same as that by the first embodiment. Since the concave reflecting member is formed by a spherical surface, the second embodiment has some advantages over the first embodiment in that it is easy to manufacture and inexpensive.

In the second embodiment shown in FIG. 3, the annular filter 12 and the annular concave reflecting member 11' are supported together by a holder ring 15. The holder ring 15 is mounted on a lens tube 14 for the objective lens 2.

The filter 12 corresponds to the filter previously shown in FIG. 2. In the manner shown in the figure, eight photo sensors 13a–13h are arranged the annular filter and fixed to it. In the manufacturing process of the apparatus, the filter 12, photo sensors 13a–13h and the reflecting member 11' are movable together in the direction along the optical axis by rotating the holder ring 15. After the completion of assembly and adjustment, these members are fixed and held in the position in which the scattered light from the test object surface can be received best with the highest efficiency.

Various modifications are possible in the above two embodiments. For example, the concave reflecting members used as the converging ring member for converting the scattered light into a beam of collimated rays in the above embodiments may be replaced by a hollow ring positive lens having a larger diameter than the objective lens.

As readily understood from the foregoing, the optical apparatus for the detection of scattered light according to the invention has many advantages over the prior art.

In the apparatus according to the invention, the scattered light produced by the boundary of the pattern on a test piece is converted into a beam of collimated rays by the converging ring member such as a concave reflecting member or a hollow positive lens. The collimated light enters a filter which is preferably an interference filter. As the collimated beam enters the filter, the apparatus according to the invention is free from the adverse effect of characteristic variation of the interference filter. The wavelength which an interference filter transmits is variable depending upon the angle of incidence to the filter. Since this adverse effect is eliminated, the photo sensors in the apparatus receive only the scattered light from the test piece and no harmful stray light enters the photo sensors. Therefore, with the apparatus according to the invention the accuracy of the detection of scattered light is highly improved. Further, the apparatus is simple in construction and enables measurement, at higher precision, of smaller micro-patterns than that which can be measured with the prior art apparatus.

We claim:

1. Apparatus for the detection of scattered light from a test object, said apparatus comprising:
   light source means for supplying a beam of light having a predetermined wavelength;
   objective lens means having an objective lens and a lens tube mounting the objective lens therein, said objective lens focusing the light beam from the light source means on the test object;
   annular light converging means disposed around an end of the objective lens means near the test object for receiving scattered light from the object and for converting the scattered light into a beam of collimated light rays substantially parallel with an optical axis of the objective lens;
   an annular filter member disposed around said end of the objective lens means for filtering the collimated light rays from said annular light converging means, said annular filter member being constructed to transmit the collimated light rays of said predetermined wavelength while filtering off light rays of other wavelengths;
   photo sensor means mounted on the annular filter member at an exit side thereof for receiving the collimated light rays transmitted by the annular filter member and for generating electric signals corresponding to the intensity of the received light rays; and
   a holder ring member mounted on said lens tube and supporting said annular light converging means and said annular filter member around the periphery of the lens tube.

2. Apparatus according to claim 1, wherein said light converging means is a concave reflecting member.

3. Apparatus according to claim 2, wherein said concave reflecting member is a paraboloidal surface the focus of which is nearly at the point at which the light beam is focused through the objective lens means.

4. Apparatus according to claim 2, wherein said concave reflecting member is a toroidal surface, the toroid section of which taken along a plane containing the optical axis of the lens is a circle the curvature center of which lies outside the optical axis of the lens.

5. Apparatus according to claim 1, wherein said photo sensor means includes plural photo sensor elements regularly arranged on the annular filter member at equal angular intervals.

6. Apparatus for the detection of scattered light from a test object, said apparatus comprising:
   light source means for supplying a beam of light having a predetermined wavelength;
   objective lens means for focusing the light beam from the light source means on the test object;
   annular light converging means disposed around an end of the objective lens means near the test object for receiving scattered light from the object and for converting the light into a beam of collimated light rays substantially parallel with an optical axis of the objective lens means;
   an annular filter means disposed around the objective lens means for filtering the collimated light rays from said annular light converging means, said annular filter means being constructed to transmit light rays of said predetermined wavelength while filtering off light rays of other wavelengths; and
   photo sensor means including plural photo sensor elements mounted on an exit side of said annular filter member at equal angular intervals, said photo sensor elements receiving the collimated light rays transmitted by the annular filter member and generating electric signals corresponding to the intensity of the received light rays.

7. Apparatus according to claim 6, wherein said objective lens means includes a lens tube, said apparatus further comprising a holder ring member mounted on the lens tube and supporting said annular light converging means and said annular filter member around the periphery of the lens tube.

8. Apparatus according to claim 7, wherein said annular light converging means is a concave reflecting member.

9. Apparatus according to claim 8, wherein said annular filter member has a filtering characteristic that varies depending upon the angle of incidence of light of the filter member.

* * * * *